May 21, 1963  O. E. JOHANSSON  3,090,610
POWER SPRING
Filed July 24, 1961

INVENTOR.
OSCAR E. JOHANSSON
BY
Curtis, Morris & Safford
ATTORNEYS

United States Patent Office 3,090,610
Patented May 21, 1963

3,090,610
POWER SPRING
Oscar E. Johansson, Fair Lawn, N.J., assignor to Sandvik Steel, Inc., Fair Lawn, N.J., a corporation of New York
Filed July 24, 1961, Ser. No. 126,233
5 Claims. (Cl. 267—1)

The present invention relates to improvements in the construction of springs of the type described and claimed in my copending application Serial No. 745,205, filed June 27, 1958 and entitled Power Spring, now Patent 2,993,689 issued July 25, 1961. Power springs of this type store energy as the spring is wound and deliver the stored energy when it unwinds.

Such springs have a multitude of different uses for either storing energy slowly and delivering the energy quickly, or for storing energy quickly and delivering the stored energy at a slow rate. For purposes of description in the specification and claims, all such helically coiled springs are referred to as power springs without distinction as to their particular use, application or installation.

Power springs are usually enclosed in a rotating barrel or fixed housing with one end anchored thereto and its other end anchored to an axial post or rotating shaft. The barrel may rotate with respect to the axial post, or the axial shaft may rotate with respect to the fixed housing. In either case, the initial installation or replacement of such a spring is apt to present a time consuming nuisance problem. If the spring is in an extended or unwound condition it must be coiled to a diameter to adapt it to fit into the barrel or housing. With a heavy duty power spring this procedure is impractical. Usually, such a spring is wound by a machine to a small diameter at the place where it is manufactured and a peripheral band or keeper is applied around its outer periphery. Such keepers facilitate handling during shipment and installation. However, the retaining band or keeper constitutes an additional element and the installation of the spring involves transferring it from its keeper to a barrel or housing and attaching the ends of the spring to the relatively movable parts of the device in which it is used. If a heavy duty power spring escapes from its keeper before or during installation it is a hazard at the time of its escape, and it must be returned to the factory to be rewound and confined.

A wound power spring tends to unwind in asymmetrical loops extending outwardly from one side of the arbor. This asymmetrical unwinding causes the loops to engage and rub against each other which, in turn, produces excessive friction and binding of the loops of the spring. Such friction and binding produces non-uniform unwinding of the spring, and also causes it to deliver energy at a non-uniform rate.

In my prior application Serial No. 745,205, referred to above, several forms of spring construction are illustrated and described having a permanent keeper for retaining the coils of the spring and a bridle to oppose asymmetrical unwinding of the spring coils. In one form of construction, an outer confined coil of the power spring constitutes the keeper and the bridle is formed by a short strip attached to the keeper and extending between adjacent coils of the power spring. In another form of construction, the keeper is formed by a separate band to which the spring strip and bridle are attached.

One of the objects of the present invention is to provide an improved power spring of the type indicated in which a single strip forms a combined keeper and bridle.

Another object is to provide a power spring of the type indicated in which a single fastener forms the keeper and connects the power spring and its anchoring means to the keeper.

Still another object is to provide a power spring of the type indicated which is of simple and compact construction, economical to manufacture and reliable in operation.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

Figure 1:
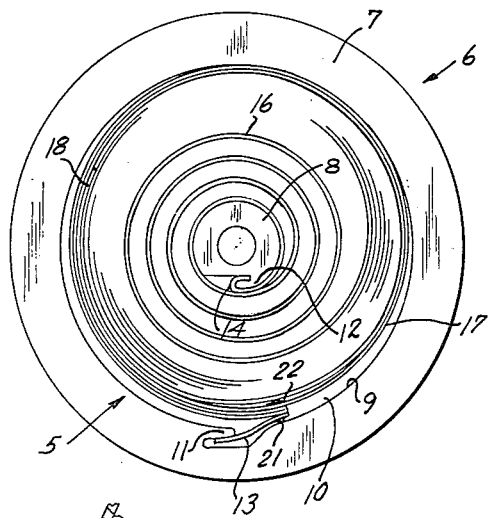
FIGURE 1 is a plan view of a power spring incorporating the novel features of the present invention and shown mounted in the barrel of a device with which it is used in an unwound condition with its ends anchored to the barrel and post, respectively.
Figure 2:
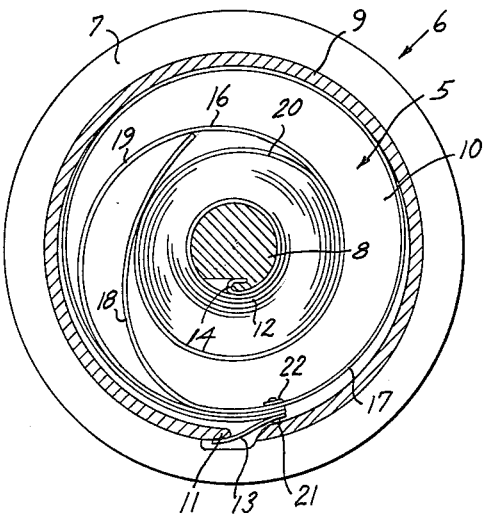
FIGURE 2 is a view similar to FIGURE 1 and showing the relation of the spring coils and bridle to oppose bunching of the coils when the spring is wound around the post.

FIGURES 1 and 2 of the drawings show a power spring 5, incorporating the novel features of the present invention, installed in a device 6 with which it is used. For purposes of description, the device 6 is shown as comprising a barrel 7 mounted to rotate on a fixed post 8 projecting from a suitable base. The barrel 7 has a peripheral wall 9 forming a cylindrical pocket 10. Wall 9 of the barrel 7 is slotted to provide an anchoring shoulder 11 and post 8 is slotted to provide an anchoring shoulder 12. Spring 5 is positioned in the cylindrical pocket 10 of the barrel 6 and has hooks 13 and 14 at its ends anchored to the shoulders 11 and 12, respectively.

Figure 3:
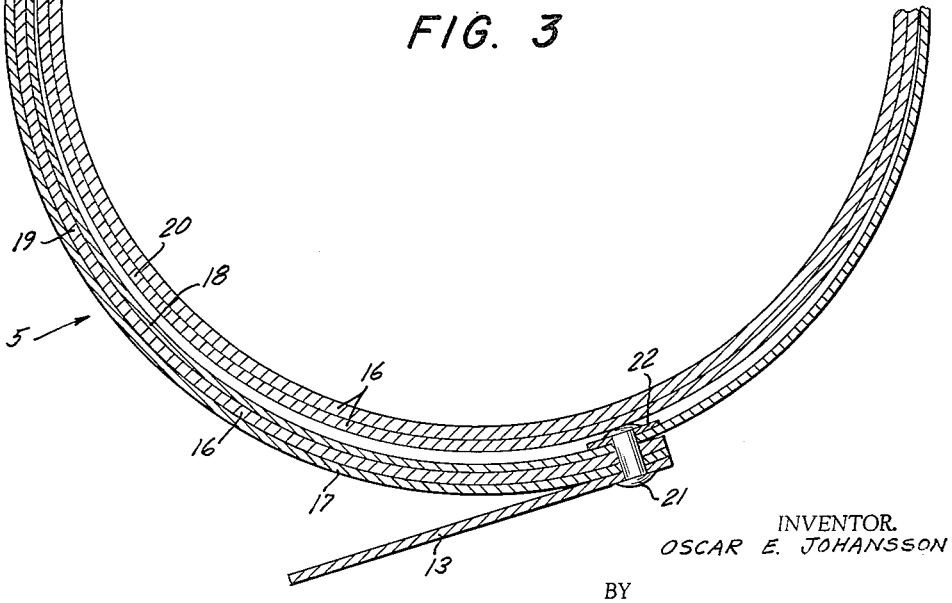
FIGURE 3 is an enlarged view of a portion of the spring to more clearly show the relationship of the strips forming the power spring and combined keeper and bridle.

As shown most clearly in FIGURE 3, the spring 5 comprises a strip 16 of flexible resilient material, such as spring steel, wound in spiral coils within a keeper 17. Keeper 17 is in the form of a spring strip and in addition to retaining the coils of spring strip 16, also provides a bridle 18 acting between adjacent coils 19 and 20 of the spring strip to prevent its coils from bunching at one side of the post 8. The invention also provides a construction in which a single fastener 21 forms the combined keeper 17 and bridle 18 and connects the spring strip 16 to the keeper. In addition, the single fastener 21 also connects an additional short strip to the spring 5 to form the hook 13 for engaging the anchoring shoulder 11 on the wall of the barrel 7 to connect the spring 5 to the barrel 6.

In accordance with the present invention, the combined keeper 17 and bridle 18 is formed by a relatively short outer strip, and the power spring is formed by an inner and longer strip 16. One end of the inner and outer strips 16 and 17, 18 are aligned and wound together into a coil of the diameter desired for the particular spring 5. Fastener 21, illustrated in the form of a rivet, is then inserted through aligned holes in the overlapping portions of the outer strip 17, 18 and the inner strip 16 positioned therebetween. The holes in the strips 16 and 17, 18 preferably are formed therein prior to winding into a coil, or may be drilled in the strips after they have been wound to form a single coil in a suitable jig or fixture. In the illustrated embodiment, the fastener 21 is shown extending through the strips 16 and 17, 18 adjacent their aligned ends, and the rivet is headed over a retaining plate 22 at the outer periphery of the retaining band or keeper. It will be understood, however, that the fastener 21 may take any suitable form, such as a spot weld.

The connected overlapping portions of the outer strip then forms the keeper 17 with the end of the inner strip 16 connected thereto between its overlapping portions by the fastener 21. The inner strip 16 is wound helically in successive coils which are retained against outward expansion by the surrounding keeper 17.

The inner end of the outer strip forming the keeper 17 extends beyond the fastener 21 for a distance greater than 90° of the coils of the inner spring strip 16 and less than 180° to form the bridle 18. In the illustrated embodiment, the bridle 18 is shown extending 120° beyond the fastening rivet 21 when the spring 5 is unwound as illustrated in FIGURE 1 and extends through a greater arc when the spring is fully wound as shown in FIGURE 2. One form of the invention having now been described in detail, the mode of operation is explained below.

For purposes of description, let it be assumed that the spring is mounted in a barrel 6 with its hooked ends 13 and 14 connected to the shoulders 11 and 12 on the barrel and post 8, respectively, as shown in FIGURE 1. The initial winding causes the spring strip 16 to form into a free spiral with all of the coils winding freely, without contacting each other. Continued winding causes the inner portion of the spring strip 16 adjacent the hooked end 14 to be drawn into a tight spiral coil around the post 8. This produces a tension on the remaining coils tending to cause the coils to bunch on one side of the post 8 and frictionally engage each other.

As the spring 5 is wound toward the condition illustrated in FIGURE 2, bridle 18 projecting to the left from the fastener 21 resists flexing of the outer coil 19 of spring strip 16 to a coil of the smaller radius of adjacent coil 20. In other words, the bridle 18 tends to hold the outer coil 19 of the spring 16 against the adjacent surface of the retaining band or keeper 17. As winding continues and the lateral tension increases, the free end of the bridle 18 tends to straighten out and forms a chord between the outer coil 19 of the spring strip 16 and the next adjacent inner coil 20. This action of the bridle 18 tends to hold the coiling spring symmetrical to the post 8 so that there is a free winding movement of the inner end of the spring around the post 8. Furthermore, the action of the bridle 18 on the outer coils 19 and 20 is transmitted through these coils to the inner coils to resist radial inward movement of the latter. The symmetrical condition then prevents objectionable friction between the adjacent coils of the spring strip 16 which has been encountered with similar springs in the past. This, in turn, insures that the spring 5 as a whole exerts a constant torque and prevents objectionable friction and uneven movement between the coils.

Furthermore, springs constructed in accordance with the present invention constitute self-contained unitary structures which do not require the use of storage or retaining rings or barrels to hold the springs during shipment, or during insertion or removal from the devices with which they are used. The springs may be installed and later removed or replaced as a unit without difficulty or hazard. The springs may be connected in mechanisms so that either the barrel or the post may be turned for winding the spring, and so that either is turned for unwinding. Hence, the invention is adaptable to many conditions of use and operation, and to many different types of spring mechanisms.

It will now be observed that the present invention provides an improved power spring in which a single strip forms a combined keeper and bridle. It will still further be observed that the present invention provides a power spring in which a single fastener forms a keeper and connects the power spring and its anchoring means to the keeper. It will still further be observed that the present invention provides a power spring which is of simple and compact construction, economical to manufacture and one which is reliable in operation.

This application is a continuation-in-part of my prior application Serial No. 745,205, referred to above, and relates back to said application for all common subject matter.

While a single embodiment of the invention is herein illustrated and described, it will be understood that changes may be made in the construction and arrangement of elements without departing from the spirit or scope of the invention. Therefore, without limitation in this respect, the invention is defined by the following claims.

I claim:

1. A self-contained and self-supporting power spring adapted to be easily and quickly installed and removed comprising, outer and inner strips of a flexible and resilient material wound spirally in adjacent overlying coils, fastening means connecting the outer and inner strips and the overlapping portion of the outer strip to each other to form an enclosing band constituting a keeper, the wound coils of the inner strip constituting a power spring enclosed and held by said keeper, and the outer strip extending between the overlying outer coils of the power spring and beyond said fastening means a distance greater than 90° of the wound coils to provide a bridle for holding the overlying outer coils spaced from each other.

2. A self-contained and self-supporting power spring adapted to be easily and quickly installed, a strip of a flexible resilient material wound spirally in overlying coils to form the spring, a combined keeper and bridle comprising an outer strip of a flexible, resilient material wound with the spring strip in adjacent overlying layers, a single fastener connecting the overlapping portions of the outer strip and spring strip therebetween to provide a keeper for the spring strip, and the inner end of the outer strip extending beyond the fastener between adjacent coils of the spring strip for providing a bridle to oppose bunching of the overlapping coils of the spring strip.

3. A power spring in accordance with claim 2 in which a short strip is positioned at the periphery of the outer strip and attached thereto by the single fastener, and said short strip extending tangentially from the periphery of the keeper to provide a connection for mounting the power spring.

4. A power spring in accordance with claim 2 in which the spring strip and outer strip have their outer ends in radial alignment, and the single fastener extending therethrough adjacent said aligned ends.

5. A power spring in accordance with claim 2 in which the spring strip and outer strip have corresponding ends in radial alignment, a short strip positioned at the periphery of the outer strip and attached thereto by the single fastener to provide a mounting for the power spring, and said fastener constituting a single rivet extending through the short strip, outer strip and inner strip to connect the strips to each other.

References Cited in the file of this patent

UNITED STATES PATENTS

| 1,403,039 | Kolling | Jan. 10, 1922 |
| 1,478,173 | Clark | Dec. 18, 1923 |
| 1,964,280 | Witchger | June 26, 1934 |

FOREIGN PATENTS

| 335,154 | Switzerland | Feb. 14, 1959 |